United States Patent
Hamon et al.

(10) Patent No.: US 10,701,943 B2
(45) Date of Patent: Jul. 7, 2020

(54) SYSTEM FOR HANDLING CULINARY PREPARATIONS

(71) Applicant: EKIM, Montevrain (FR)

(72) Inventors: Cyrill Hamon, Montevrain (FR); Sébastien Roverso, Bussy-Saint-Georges (FR); Didier Rascle, Montevrain (FR)

(73) Assignee: EKIM, Montevrain (FR)

(*) Notice: Subject to any disclaimer, the term of this patent is extended or adjusted under 35 U.S.C. 154(b) by 0 days.

(21) Appl. No.: 16/074,999

(22) PCT Filed: Feb. 2, 2017

(86) PCT No.: PCT/EP2017/052225
§ 371 (c)(1),
(2) Date: Aug. 2, 2018

(87) PCT Pub. No.: WO2017/134149
PCT Pub. Date: Aug. 10, 2017

(65) Prior Publication Data
US 2019/0037860 A1     Feb. 7, 2019

(30) Foreign Application Priority Data
Feb. 3, 2016  (FR) .................................. 16 50844
Jan. 31, 2017  (FR) .................................. 17 50806

(51) Int. Cl.
*A21C 9/08* (2006.01)
*A21C 11/00* (2006.01)
(Continued)

(52) U.S. Cl.
CPC ............ *A21C 11/006* (2013.01); *A21C 11/00* (2013.01); *A21C 14/00* (2013.01); *A21D 13/41* (2017.01);
(Continued)

(58) Field of Classification Search
CPC ......... A21C 11/006; A21C 11/12; A21C 9/04; A21C 11/004; A21D 8/02
See application file for complete search history.

(56) References Cited

U.S. PATENT DOCUMENTS 2,770,182 A * 11/1956 Jensen ................. A47J 37/0611
    99/373
3,687,688 A *  8/1972 Stapley et al. ...... A47J 37/1214
    426/302
(Continued)

FOREIGN PATENT DOCUMENTS

AU     763526 B2    7/2001
EP    1107199 A2    6/2001
(Continued)

OTHER PUBLICATIONS

French Search Report from French Patent Application No. 1650844, dated Oct. 26, 2016.
(Continued)

*Primary Examiner* — Seyed Masoud Malekzadeh
(74) *Attorney, Agent, or Firm* — Greer, Burns & Crain, Ltd.

(57) ABSTRACT

A system for handling culinary preparations, which includes: a mounting (I) including an upper surface arranged to receive a culinary preparation, and a plurality of feedthroughs extending between the upper surface and a lower surface; a transfer device including a plurality of projecting portions; a relative movement system being arranged to position the system in a low position, in which no projecting portion projects relative to the upper surface of the mounting, and a high position, in which one end of at least one projecting portion is made to project through the feedthroughs, relative to the upper surface of the mounting;
(Continued)

and a handling tool including oblong elements arranged to be inserted between projecting portions.

18 Claims, 3 Drawing Sheets

(51) Int. Cl.
      *A21C 14/00*      (2006.01)
      *A21D 13/41*      (2017.01)
      *A21C 9/04*      (2006.01)
      *A21D 8/02*      (2006.01)
      *B29C 43/36*      (2006.01)

(52) U.S. Cl.
      CPC .................. *A21C 9/04* (2013.01); *A21D 8/02* (2013.01); *B29C 43/3607* (2013.01)

(56) References Cited

U.S. PATENT DOCUMENTS

| | | | | |
|---|---|---|---|---|
| 3,736,859 A | * | 6/1973 | Carlson | A47J 37/0611 99/331 |
| 5,170,696 A | * | 12/1992 | Reed | A47J 27/20 99/349 |
| 5,921,170 A | * | 7/1999 | Khatchadourian | A21C 9/04 99/349 |
| 6,158,315 A | * | 12/2000 | Nowotny | A21C 3/06 83/102 |
| 6,398,539 B1 | | 6/2002 | Lawrence | |
| 9,210,946 B2 | * | 12/2015 | Hoffman | A23N 15/02 |
| 2001/0002674 A1 | * | 6/2001 | Gubbini | A21C 9/08 221/13 |
| 2002/0022071 A1 | | 2/2002 | Hansen | |
| 2007/0178198 A1 | * | 8/2007 | Lichtenstein | A21C 11/006 426/138 |
| 2011/0209661 A1 | | 9/2011 | Fritz-Jung et al. | |
| 2012/0185086 A1 | | 7/2012 | Khatchadourian et al. | |

FOREIGN PATENT DOCUMENTS

| | | | |
|---|---|---|---|
| EP | 2174549 A1 | 4/2010 | |
| FR | 2971122 A1 | 8/2012 | |

OTHER PUBLICATIONS

French Search Report from French Patent Application No. 1750806, dated Jul. 4, 2017.

International Search Report from International Patent Application No. PCT/EP2017/052225, dated Apr. 28, 2017.

Written Opinion of the International Searching Authority from International Patent Application No. PCT/EP2017/052225, dated Apr. 28, 2017.

* cited by examiner

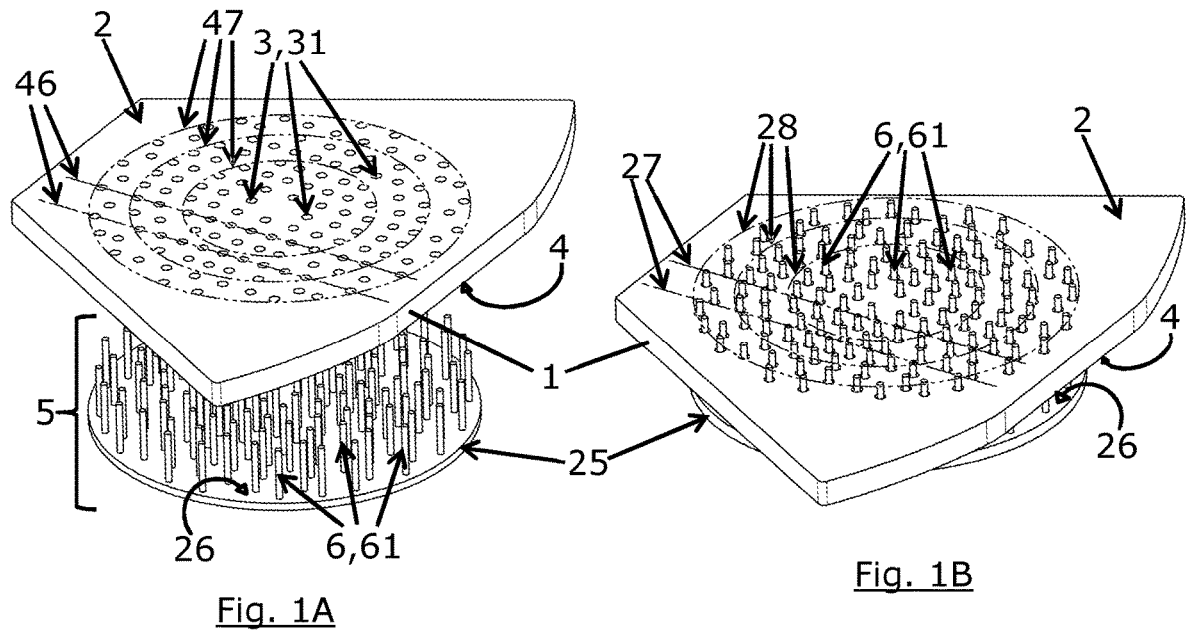
Fig. 1A
Fig. 1B
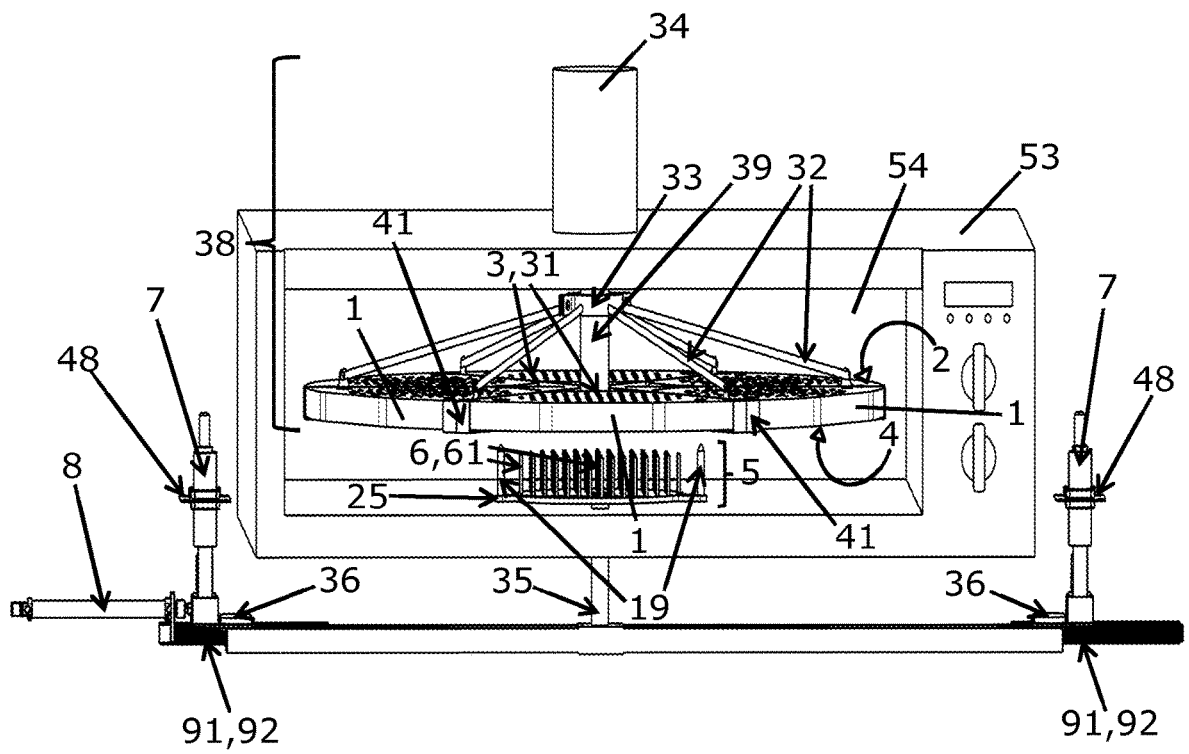
Fig. 2

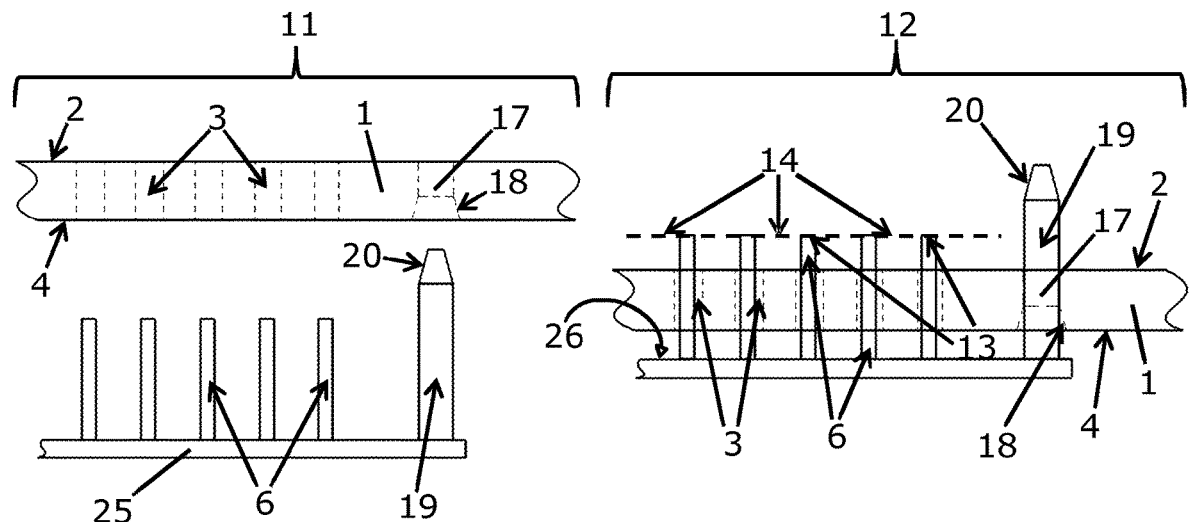
Fig. 3
Fig. 4
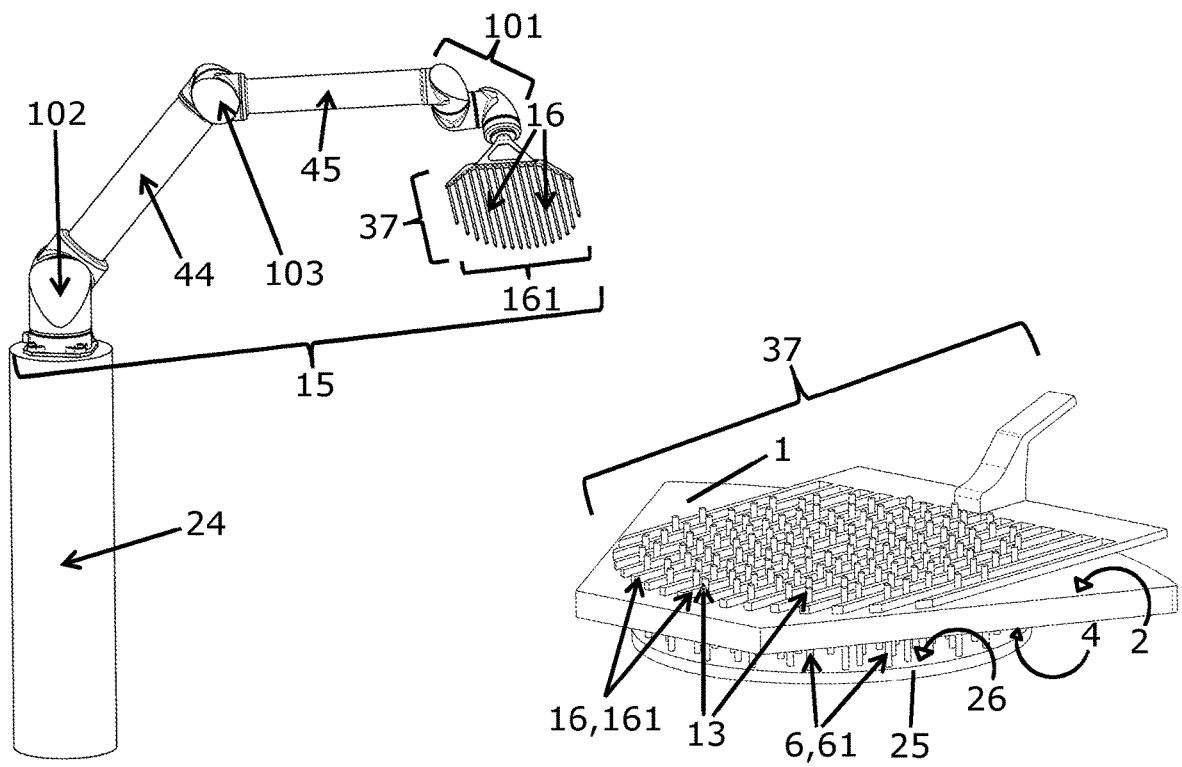
Fig. 5
Fig. 6

SYSTEM FOR HANDLING CULINARY PREPARATIONS

BACKGROUND

The present invention relates to the field of handling culinary preparations. It relates to a system for handling food preparations for conveying a preparation between different preparation stations, such as, inter alia, the dough forming station, the sauce loading station, the toppings loading station, the cooking station and the packing station.

The present invention relates in particular to the handling of dough-based culinary preparations to be cooked and the use of the system in an automated system for culinary preparations, in particular for preparing pizzas. The present invention is situated within the field of automatic distribution, semi-industrial fast-food catering and industrial culinary preparations.

Automated machines are known in the state of the prior art for preparing pizzas in which conveying the preparation between the different stations of the preparation chain is carried out via several different handling devices. Thus, document EP1107199 discloses the use of a first handling device comprising gripping elements making it possible to convey a dough piece from a storage space to a container. A second, separate handling device arranged in the form of a shovel and comprising an unloading lever makes it possible to convey the pizza from the container to a cooking station. Finally, a third device comprising a grill arranged in order to receive the preparation makes it possible to convey the preparation from the oven to a distribution station. A drawback of this type of conveyance system is that it requires the use of several different handling elements. This has the effect of increasing the size of the automated machines, making their design and maintenance more complex, and increasing the risk of breakdown. A further drawback lies in the type of handling elements used, as some of these elements may result in marks on the preparation when grasping it during handling. Other elements require a step of transferring the preparation from one element to another, which may cause defects in the appearance, or even the loss of toppings.

The document FR2971122 is also known in the state of the prior art, describing the use of an automatic oven loader making it possible to load and unload pizzas, pies or loaves. The invention discloses a device comprising gripping elements arranged in order to recover the preparation and on which the preparation rests, and a food pusher making it possible to unload the preparation. A drawback of this type of handling means is associated with the fact that the preparations can be damaged or even pierced by the gripping element during loading or by the food pusher during unloading. In addition, the gripping elements cause significant repeated friction on the support on which the preparation rests.

An aim of the invention is to propose a single handling system the purpose of which is to overcome the various aforementioned drawbacks.

A further aim of the invention is to propose a single handling system making it possible to convey a culinary preparation between different stations during preparation.

A further aim of the invention is to be able to load one culinary preparation and take up another culinary preparation in one and the same pass.

A further aim of the invention is to propose a system making it possible to provide even cooking of the culinary preparations.

A further aim of the invention is to propose a system that is adapted to any type of support of the culinary preparation, in particular to delicate supports such as the support comprising a coating, for example Teflon™, or cooking supports, for example firestones.

A further aim of the invention is to be able to peel off the culinary preparation from its support in a reliable and reproducible manner without damaging it.

A further aim of the invention is to propose a system making it possible to handle non-rigid culinary preparations.

SUMMARY

To this end, the invention proposes a system for handling culinary preparations comprising:
 a support comprising:
  an upper surface arranged in order to receive a culinary preparation, and
  a plurality of pass-through openings extending between the upper surface and a lower surface,
 a transfer device comprising a plurality of projecting portions,
 a system for driving relative movement of the support with respect to at least one part of the transfer device.

According to the invention, the system is characterized in that the system for driving relative movement is arranged in order to position the system in:
 a low or first position, in which no projecting portion protrudes with respect to the upper surface of the support,
 a high or second position, in which one end of the at least one projecting portion protrudes, via the pass-through openings, with respect to the upper surface of the support, such that the culinary preparation no longer rests on the upper surface of the support.

According to the invention, the system is also characterized in that it comprises a handling tool comprising oblong elements arranged in order to be inserted between the projecting portions.

By culinary preparations is meant any solid culinary preparation, which may also be soft.

By culinary preparations is also meant preparations that are capable of being viscous and made to solidify during a transformation step.

Preferably, the culinary preparations can be dough-based.

The culinary preparations can also be pizzas, crepes, loaves, paninis, toasted sandwiches, burgers, pies, cakes, biscuits, portions of foods such as, inter alia, meat, vegetables, starchy foods, fruits. The culinary preparations can be supported by, or contained in, one or more intermediate supports, such as in particular a baking tin, a baking tray, a baking paper.

When the system is in a low position, ends of the projecting portions may be level with the upper surface of the support. In this case, the ends of the projecting portions can form an almost even surface with the upper surface, while rendering the pass-through openings semi-sealed.

The pass-through openings can extend between the upper surface and the lower surface in a non-perpendicular direction to the upper surface and/or the lower surface.

By support is meant any type of support that can be used during a process for the transformation of a culinary preparation.

The support can also be a plate situated in a refrigeration element, a plate situated in a freezer, a plate of a forming machine, a plate arranged in order to receive a preparation in a transformation station, for example a topping station.

By oblong element is meant an element having a shape the length of which is longer than its width.

At least one of the oblong elements of the handling tool can be inserted between the projecting portions.

The at least one of the oblong elements can be inserted in between the projecting portions by:
- moving the at least one element of the oblong elements with respect to the projecting portions, or
- moving the handling tool with respect to the projecting portions,
- moving at least one projecting portion with respect to the oblong elements.

The oblong elements can be inserted between the projecting portions in at least one direction.

The handling tool can be moved in a controlled manner.

Preferably, the handling tool may or may not be a robotic device. It can be a simple peel.

One end of a projecting portion can also have a flat, rounded, conical or truncated shape.

The end of the at least one projecting portion can protrude with respect to the upper surface of the support by:
- moving the at least one projecting portion with respect to the support, or
- moving the transfer device with respect to the support, or
- moving the support with respect to the at least one projecting portion.

According to the invention:
- the transfer device can comprise a grid of projecting portions arranged in a pattern,
- the support can comprise a grid of pass-through openings arranged in a pattern complementary to the pattern of the grid of projecting portions; said grids being arranged so that the grid of projecting portions can be inserted into the grid of pass-through openings.

By grid is meant any arrangement of the parts constituting the grid according to a particular geometrical pattern.

Ends of the pass-through openings of the grid of projecting portions can protrude, via the pass-through openings, with respect to the upper surface of the support, by moving at least one projecting portion, or several projecting portions or the projecting portions in their entirety with respect to the support.

Ends of the projecting portions of the grid of projecting portions can protrude, via the pass-through openings, with respect to the upper surface of the support, by moving the support with respect to the transfer device.

According to the invention, the handling tool can comprise a grid of oblong elements arranged in a pattern complementary to the pattern of the grid of projecting portions; said grids being arranged so that the grid of projecting portions and the grid of oblong elements interpenetrate.

The grid of projecting portions and the grid of oblong elements can interpenetrate in at least one direction.

According to the invention, the grid of projecting portions can comprise a set of sub-grids, the set of sub-grids forming the grid of projecting portions; a portion of a sub-grid or a sub-grid being capable of forming part of one or more sub-grids.

The grid of pass-through openings can comprise a set of sub-grids, the set of sub-grids forming the grid of projecting portions; a portion of a sub-grid or a sub-grid being capable of forming part of one or more sub-grids.

The grid of oblong elements can comprise a set of sub-grids, the set of sub-grids forming the grid of projecting portions; a portion of a sub-grid or a sub-grid being capable of forming part of one or more sub-grids.

According to the invention, the system can comprise a guidance device characterized in that at least one pass-through opening is a guide pass-through opening having a chamfer on the side of the lower surface of the support in which the projecting portions are intended to be inserted.

The guide pass-through opening may or may not form part of the grid of pass-through openings.

According to the invention, the system can comprise a guidance device characterized in that at least one projecting portion is a guide projecting portion being arranged in order to be inserted into a pass-through opening and having a length greater than the lengths of the other projecting portions.

The guide projecting portion may or may not form part of the grid of projecting portions.

A length of a projecting portion extends as the distance between an upper surface of the transfer device with respect to which the projecting portions protrude, and one end of said projecting portion.

A length of one projecting portion can be different from a length of another projecting portion, or several other projecting portions or all the other projecting portions.

The projecting portions can all have the same length.

The length of the at least one guide projecting portion can be greater than 5 to 50% with respect to a length of one or more projecting portions having a length greater than the lengths of the other projecting portions.

According to the invention, the system can comprise a guidance device comprising at least one guide projecting portion having a chamfer.

The chamfer of the guide projecting portion can have a cutting edge angle identical to the cutting edge angle of the chamfer of the guide pass-through opening.

The cutting edge angle of a chamfer is defined as the angle formed between a face of the chamfer and a direction perpendicular to the lower support surface.

The system according to the invention can comprise an interchangeable pass-through guidance device comprising:
- at least one through-hole produced in the lower face of the support,
- at least one ring arranged in order to be removably inserted into the at least one through-hole.

The at least one ring can comprise a chamfer.

The at least one ring can be, preferably, a wear part.

According to the invention the alloy, or the material, from which the ring is made can also be tempered steel.

The at least one ring can preferably be inserted on the side of the upper face of the support.

The system according to the invention can comprise an interchangeable blind guidance device comprising:
- at least one blind opening produced in the lower face of the support,
- at least one ring arranged in order to be removably inserted into the at least one blind opening,
- at least one retractable guide projecting portion, being arranged in order to be inserted into the at least one blind opening and capable of relative movement with respect to the other projecting portions.

According to the invention, the transfer device can comprise a platen and in that the plurality of projecting portions is a set of rods protruding with respect to an upper surface of said platen, the grid and the sub-grids of rods being arranged in order to form patterns composed of rows parallel to one another and extending in at least one direction parallel to the upper plane of the platen.

The grid and the sub-grids of rods can be arranged in order to form patterns composed of circles of different diameters.

The projecting portions can protrude with respect to the upper surface of the platen in a direction mainly perpendicular to the upper surface of the platen.

The projecting portions can protrude with respect to the upper surface of the platen in a direction that is oblique with respect to the upper surface of the platen.

When the patterns of the grid are composed of circles, the circles may or may not be concentric.

The patterns of the grid composed of parallel rows can extend in a plurality of different directions parallel to the upper plane of the platen.

The interpretation of the grid of projecting portions with the grid of oblong elements can be carried out in any one of the directions in which the parallel rows extend.

The interpretation of the grid of projecting portions with the grid of oblong elements can be carried out in a direction parallel to the upper plane of the platen or in a direction perpendicular to the upper plane of the platen or in a direction having a component parallel and a component perpendicular to the upper plane of the platen.

The grid of projecting portions can be inserted into the grid of pass-through openings in a direction perpendicular to the lower plane of the support.

The grid of projecting portions can be inserted into the grid of pass-through openings in a direction having a component parallel and a component perpendicular to the lower plane of the support.

A rod can have a maximum thickness that is less by at least 2% with respect to a minimum distance separating two walls opposite a pass-through opening in which the rod is capable of being inserted.

According to the invention, the system can comprise a fastening means of the transfer device or of the support, said fastening means being arranged in order to give the transfer device or the support a mechanical clearance in a plane parallel to the plane in which the lower face of the support is comprised.

Said mechanical clearance can be given to the platen and/or to the cooking support.

Said mechanical clearance can have a value comprised between 1 and 10% of the size of the support.

According to the invention, the system for driving relative movement can comprise:
  at least one fixed element,
  at least one gearing device connected to the at least one fixed element,
  at least one actuator arranged in order to drive the at least one gearing device,
  and characterized in that the fastening means of the transfer device or of the support comprises:
  a moveable portion fastened to the support or to the transfer device,
  a connecting element fastened to the gearing device,
  a rolling-element bearing connected on the one hand to the moveable part and on the other hand to the connecting element, said gearing device being arranged in order to provide relative movement of the moveable part with respect to the at least one fixed element.

The system for driving relative movement can be composed of two sub-parts arranged in order to drive the movement of the system in its entirety with respect to the at least one fixed element.

The gearing device can be any gearing device known to a person skilled in the art, as well as a gearing device composed of a rack and a pinion.

The actuator can be any actuator known to a person skilled in the art, as well as a cylinder actuator, preferably with a pneumatic cylinder.

According to the invention, the handling tool can be a fork comprising prongs, said prongs constituting the oblong elements of said handling tool.

The prongs of the fork can be comprised in a plane.

The fork can be situated at one end of a handling device, such as, also, an automated handling arm.

The fork and/or the prongs can be articulated with respect to the handling arm and can be oriented in different directions.

The space separating two opposite walls of two consecutive prongs of the fork can preferably be greater by at least 5% with respect to the diameter of a rod intended to be inserted between said two prongs.

The space separating two walls of two opposite prongs can preferably be less by at least 5% with respect to the distance between two walls of a prong intended to be inserted into said two rods.

The thickness of a prong is defined as the maximum distance between an upper wall of a prong of the fork arranged in order to receive the dough, and a lower wall of a prong of the fork.

A maximum thickness of a prong of the fork can preferably be less by at least 10% with respect to a minimum distance between one end of a rod protruding with respect to the upper surface of the support and the upper surface of the support.

The pizza fork can also be denoted by the term pizza peel by a person skilled in the art.

According to the invention, the support can be a cooking support.

Said support can be a heating element known to a person skilled in the art, such as also a metal material, ceramic, polymer, composite material, an alloy.

Said support can also be a hot-plate.

Said support can be a refractory element known to a person skilled in the art, such as also a metal, metalloid, composite material, oxides, carbon, alloy.

Said support can also be a refractory plate.

Said support can also be a firestone.

According to the invention, the system can comprise a cooking device, said cooking device comprising:
  several cooking supports,
  a central shaft arranged in order to be driven in rotation,
  cross members fixed to the central shaft,
  stops,
  systems for holding in abutment;
  and characterized in that a cooking support is arranged in order to be placed in abutment on two adjacent cross members and in that a system for holding in abutment exerts a constant pressure on the cooking support so as to hold the cooking support under pressure against one or more stops.

The cross members can be fixed, at a proximal end, to the central shaft.

The proximal end of a cross member extends from an end situated on the side of the central shaft.

The stops can be situated at a distal end of the cross members.

A system for holding in abutment can be in contact with the central shaft, positioned between two adjacent cross members and in contact with said two cross members, and exert a constant pressure on the cooking support so as to hold the cooking support under pressure against two stops of the cross members on which said cooking support is in abutment.

The cross members can extend in a direction perpendicular to the central shaft.

The cooking supports can be contained in a plane perpendicular to the central shaft.

The cooking supports can have a parallelepipedal shape.

The cooking supports can have a geometry of a straight prism.

The pressure exerted by the system for holding in abutment can be oriented in a direction perpendicular to the central shaft.

The pressure exerted by the system for holding in abutment can be generated by a spring.

According to the invention, the system can be used in a cooking oven, such as an oven for cooking pizzas.

BRIEF DESCRIPTION OF THE DRAWINGS

Other advantages and features of the invention will become apparent on reading the detailed description of implementations and embodiments which are in no way limitative, and the following attached drawings:

FIGS. 1A and 1B are diagrammatic representations of a side view of a support comprising a grid of pass-through openings and a transfer device comprising a platen and a grid of projecting portions.

FIG. 2 is a diagrammatic representation of a front view of a cooking oven comprising a cooking device, a system for driving relative movement and a transfer device.

FIG. 3 is a diagrammatic representation of a profile view of a low position of the system.

FIG. 4 is a diagrammatic representation of a profile view of a high position of the system.

FIG. 5 is a diagrammatic representation of a side view of a handling element.

FIG. 6 is a diagrammatic representation of an oblique view of a cooking support and a fork.

DETAILED DESCRIPTION

Figure 7:
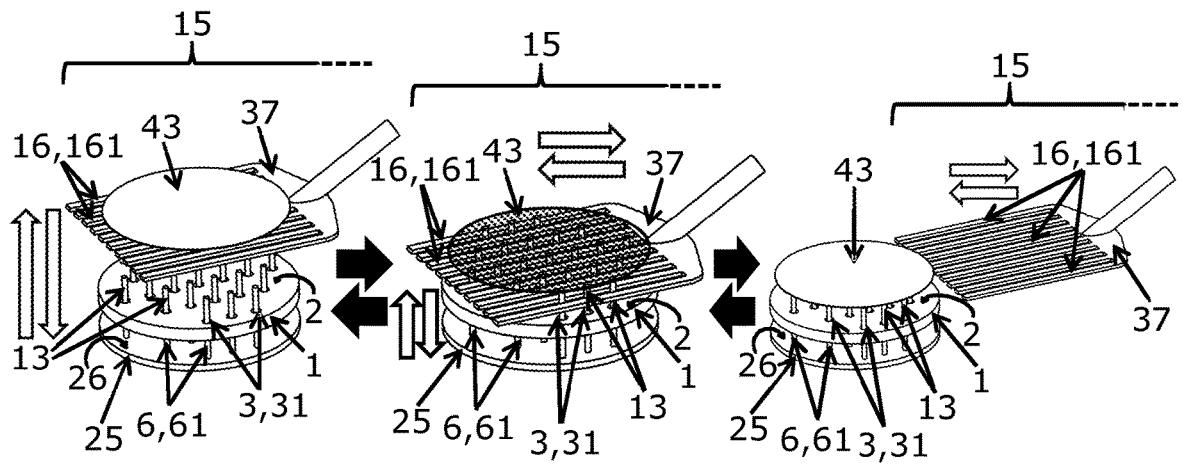
FIG. 7 is a diagrammatic representation of an oblique view of a cooking support, a transfer device and a fork situated at one end of a handling device.

As the embodiments described hereinafter are in no way limitative; variants of the invention can in particular be considered comprising only a selection of the characteristics described, in isolation from the other characteristics described, (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In FIGS. 1A and 1B, a support 1 can be seen comprising an upper surface 2 arranged in order to receive a culinary preparation 43 (not shown), a grid 31 of pass-through openings 3 extending between the upper surface 2 and a lower surface 4. The pass-through openings 3 preferably have a cylindrical shape the diameter of which is comprised between 1 and 50 mm, preferably between 2 and 20 mm, more preferably between 3 and 10 mm; they have a diameter of 8 mm according to the embodiment. The thickness of the support 1 is comprised between 1 and 500 mm, preferably between 10 and 100 mm, more preferably between 15 and 50 mm; it is 20 mm according to the embodiment.

A transfer device 5 can also be seen comprising a platen 25 and a grid 61 of projecting portions 6 extending from an upper surface 26 in a direction perpendicular to said platen 25. Sub-grids of projecting portions 6 are also noted, forming patterns composed of parallel rows 27 and concentric circles 28 having different diameters. The shape and geometry of the projecting portions 6 are adapted to the shape and geometry of the pass-through openings 3, the projecting portions 6 and the pass-through openings 3 having a cylindrical geometry according to the embodiment. Sub-grids of the projecting portions 6 are also noted on the support 1, forming patterns composed of parallel rows 46 and concentric circles 47 having different diameters. The projecting portions 6 forming the rows 27 are complementary and capable of being inserted into the pass-through openings 3 forming the rows 46. The projecting portions 6 forming the circles 28 are complementary and capable of being inserted into the pass-through openings 3 forming the circles 47. According to the embodiment, the projecting portions 6 are rods 6 having a cylindrical shape. The diameter of the rods 6 is less by 0.5 mm than the diameter of the pass-through openings 3, preferably less than 1 mm, more preferably 2 mm; it is less than 3 mm according to the embodiment. The diameter of the rods 6 is 5 mm according to the embodiment. The distance between two opposite walls of two neighbouring rods 6 is comprised between 6 and 40 mm; it is 15 mm according to the embodiment. The distance between two rods 6 is adapted to the culinary preparation 43 (not shown) intended to be placed on the support 1. In the case of the rigid preparations, the rods 6 can be spaced apart by a greater distance than in the case of non-rigid preparations.

The length of the rods 6 is adapted to the thickness of the support 1. The length of the rods 6 is such that a distance between ends 13 of the protruding rods and the upper surface 2 of the support 1 with respect to which the rods 6 protrude is comprised between 1-100 mm, preferably between 5-50 mm, more preferably between 10-30 mm; it is 15 mm according to the embodiment.

In FIG. 2, a cooking device 38 can be seen comprising supports 1, a central shaft 39, a device for driving in rotation 34, cross members 40 (not shown), stops 41, holding bars 32, a collar 33 for fastening the holding bars 32. Six supports 1 are shown in FIG. 2. The device for driving in rotation 34 is preferably positioned outside the cooking enclosure 54 of the oven 53. A heat sink made from aluminium can be installed between the central shaft 39 and the device for driving in rotation 34 in order to reduce the temperature in the vicinity of said device 34 efficiently. The holding bars 32 are fastened at one end of the collar 33 for fastening the holding bars 32 and at the other end to a cross member 40. Said holding bars 32 are composed of two parts (not shown) separated by an intermediate element (not shown) making it possible to adjust the distance between the fastening collar 33 and the end of a holding bar 32 fastened to a cross member 40. This adjustment, preferably carried out when cold, makes it possible to set the angle between the cross members 40 and the central shaft 39, and thus between the supports 1 and the central shaft 39. The holding bars 32 have a diameter comprised between 2 and 20 mm, preferably between 3 and 15 mm, more preferably between 4 and 10 mm; they have a diameter of 6 mm according to the embodiment.

A transfer device 5 can also be seen comprising a grid 61 of rods 6 extending from a platen 25 in a direction perpendicular to said platen 25, and two guide projecting portions 19 (described hereinafter).

A system for driving relative movement can also be seen comprising two fixed elements 48 and composed of two sub-parts, each of the fixed elements 48 being fastened to one of the two sub-parts of the system for driving relative movement. The system for driving relative movement also comprises a gearing device 91, 92, 93, an actuator 8, a guide shaft 7, a rolling-element bearing 36 and a moveable element 35. Each of the sub-parts is positioned on each side of the cooking oven 53 so as to give better stability, better accuracy, a better lifespan to the system for driving relative movement and to reduce the space requirement below the oven. The system for driving relative movement is positioned outside the oven 53 so as to avoid exposing the elements of the system to high temperatures. According to the embodiment, the entire system for driving relative movement is moved vertically in translation, i.e. in a direction parallel to the central shaft 39, with respect to the fixed elements 48 and thus with respect to the oven 53. According to the embodiment, the system for driving relative movement is arranged in order to drive the transfer device 5 in translational movement via the moveable element 35.

According to the embodiment, the device for driving in rotation 34 can be driven in rotation about the central shaft 39 but cannot be moved in translation in any direction. The device for driving in rotation 34 is capable of displacing, during a rotational movement, each of the supports 1 above the transfer device 5, such that during the translational movement of the transfer device 5, at least a part of the grid 61 of projecting portions 6 can be inserted into at least a part of the grid 31 of pass-through openings 3.

In the profile views shown diagrammatically in FIGS. 3 and 4, a low position 11 and a high position 12 of the system are illustrated respectively, in which can be seen a support 1 comprising an upper surface 2 and a lower surface 4, a guide pass-through opening 7 comprising a chamfer 18 on the side of the lower surface 4, pass-through openings 3; a transfer device comprising a platen 25 having an upper surface 26, a guide projecting portion 19 having a chamfer 20 at its end and projecting portions 6. The guide pass-through opening 17 and the guide projecting portion 19 form a guidance device. The opening of the guide pass-through opening 17 on the side of the lower face 4 of the support 1 is preferably oblong in shape.

In a low position 11 of the system, no projecting portion 6, 19 protrudes with respect to the upper surface 2 of the support 1. In the embodiment presented, no projecting portion 6, 19 is inserted into a pass-through opening 3, 18 when the system is in a low position 11.

In a high position 12 of the system, one end 13 of the projecting portions 6, 19 protrudes with respect to the upper surface 2 of the support 1. In this case, the ends 13 of the projecting portions 6, 19 protruding with respect to the upper surface 2 of the support 1 together form a raised surface 14 with respect to the upper surface 2 of the support 1. The raised surface 14 thus formed is capable of receiving a culinary preparation 43. The raised surface 14 thus formed is preferably parallel to the upper surface 2 of the support 1.

FIG. 5 shows a diagrammatic profile view of a handling arm 15 connected to one end of a base 24 arranged in order to drive the movement of the handling arm 15 and connected at another end to a fork 37 comprising a grid 161 of oblong elements 16. According to the embodiment, the oblong elements 16 are prongs 16 forming a grid 161. An articulation 101 connecting the arm 15 to the fork 37 makes it possible to orientate the grid 161 of prongs 16 in different directions. Another articulation 102 connects the arm 15 to the base 24 and makes it possible to orientate the arm 15 in different directions. A last articulation 103 is situated between a first part 44 and a terminal part 45 of the handling arm 15. The articulations 101, 102, 103 make it possible to position the grid 161 of prongs 16 in any plane whatsoever.

FIG. 6 shows an oblique view of a diagrammatic representation of the upper face 2 of a support 1, a fork 37 comprising prongs 16 forming a grid 161 interpenetrating with the ends 13 of projecting portions 6 constituted by rods 6 protruding with respect to the upper surface 2 of the support 1. The space separating two opposite walls of two consecutive prongs 16 of the fork 37 is greater than 1 mm, preferably 2 mm, more preferably 4 mm with respect to the diameter of a rod 6 intended to be inserted between said two prongs 16. A handling arm (not shown), on the end of which the fork 37 is situated, is arranged so that the grid of prongs 161 and the part of the rods 6 comprised between the ends 13 of the protruding rods 6 and the upper surface 2 of the support 1 interpenetrate during a movement of the arm 15 and/or the fork 37, in:
- a direction perpendicular to the upper surface 2 of the support 1, or
- a direction parallel to the upper surface 2 of the support 1, or
- a direction having a component perpendicular and a component parallel to the upper surface 2 of the support 1. The grid of prongs 161 of the fork 37 is arranged in order to form a surface capable of receiving a culinary preparation 43.

FIG. 7 shows a diagrammatic representation in an oblique view of the upper surface 2 of a support 1 comprising a grid 31 of pass-through openings 3; a transfer device comprising a grid 61 of rods 6 extending from an upper surface 26 (not shown) of a platen 25, the system being positioned in a high position 12, and a fork 37 comprising a grid 161 of prongs 16.

The transfer of a culinary preparation 43 from the fork 37 to the upper surface 2 of the support 1 can be divided into three steps.

A first step consists of transferring the culinary preparation 43 from the surface formed by the grid 161 of prongs 16 of the fork 37 to the raised surface 14 (not shown) formed by the ends 13 of the grid 61 of rods 6 protruding with respect to the upper surface 2 of the support 1. This transfer can be carried out when the system is initially in a high position 12 or low position 11. When the system is initially in a low position 11, this first step can be carried out during:
- a movement of the arm 15 (not shown in its entirety) in a direction perpendicular or parallel or in a direction having a component parallel and a component perpendicular to the upper surface 2 of the support 1 and oriented towards the support 1 so as to position the grid 161 of prongs 16 of the fork 37 in a plane situated between the upper surface 2 of the support 1 and the raised surface 14 formed by the ends 13 of the grid 61 of rods 6 protruding with respect to the upper surface 2 of the support 1, followed by the system passing from a low position 11 to a high position 12. When the system passes from a low position 11 to a high position 12, the ends 13 of the rods 6:

protrude with respect to the upper surface 2 of the support 1, then interpenetrate with the prongs 16 of the fork 37, make contact with a lower surface of the culinary preparation 43 in order to transfer the culinary preparation 43 from the surface formed by the grid 161 of prongs 16 to the raised surface 14, lift the culinary preparation 43 with respect to the surface formed by the grid 161 of prongs 16 towards the raised surface 14.

When the system is initially in a high position 12, this first step (not shown) can be carried out during:

a movement of the arm 15 in a perpendicular direction or in a direction having a parallel component and a perpendicular component with respect to the upper surface 2 of the support 1 and oriented towards the support 1 so as to transfer the culinary preparation 43 from the surface formed by the grid 161 of prongs 16 of the fork 37 to the raised surface 14 formed by the ends 13 of the grid 61 of rods 6 protruding with respect to the upper surface 2 of the support 1. During this movement, the prongs 16 of the fork 37 interpenetrate with the ends 13 of the protruding rods 6 and are then in a plane situated between the upper surface 2 of the support 1 and the raised surface 14 formed by the ends 13 of the rods 6 protruding with respect to the upper surface 2 of the support 1.

A second step consists of withdrawing the grid 161 of prongs 16 of the fork 37 from the grid 61 formed by the ends 13 of the rods 6 protruding with respect to the upper surface 2 of the support 1 during a movement of the handling arm 15 in a direction parallel to the upper surface 2 of the support and/or parallel to the prongs 16 of the fork 37.

A third step consists of bringing the system from a high position 12 to a low position 11 so as to transfer the preparation 43 from the raised surface 14 formed by the ends 13 of the grid 61 of rods 6 protruding towards the upper surface 2 of the support 1.

The transfer of a culinary preparation 43 from the upper surface 2 of the support 1 to the surface formed by the grid 161 of prongs 16 of the fork 37 can be divided into three steps.

A first step consists of bringing the system from a low position 11 to a high position 12 so as to transfer the culinary preparation 43 from the upper surface 2 of the support 1 to the raised surface 14 formed by the ends 13 of the grid 61 of rods 6 protruding with respect to the upper surface 2 of the support 1.

A second step consists of inserting the grid 161 of prongs 16 of the fork 37 into the grid 61 formed by the ends 13 of the rods 6 protruding with respect to the upper surface 2 of the support 1 during a movement of the arm 15 in a direction parallel to the upper surface 2 of the support 1. The grid 161 of prongs 16 of the fork 37 is then in a plane situated between the upper surface 2 of the support 1 and the raised surface 14 formed by the ends 13 of the grid 61 of rods 6 protruding with respect to the upper surface 2 of the support 1.

A third step consists of transferring the culinary preparation 43 from the raised surface 14 formed by the ends 13 of the grid 61 of rods 6 protruding with respect to the upper surface 2 of the support 1 towards the surface formed by the grid 161 of prongs 16 of the fork 37 during:

a movement of the arm 15 in a perpendicular direction or in a direction having a parallel component and a perpendicular component with respect to the upper surface 2 of the support 1, or the passage of the system from a high position 12 to a low position 11.

During the step of transfer of the culinary preparation 43 from the upper face 2 of the support 1 to the raised surface 14 formed by the ends 13 of the grid 61 of rods 6 protruding with respect to the upper surface 2 of the support 1, the maximum force exerted by the system for driving movement is 1000 Newton (N), preferably 500 N, more preferably 200 N; it is 150 N according to the embodiment.

Figure 8:
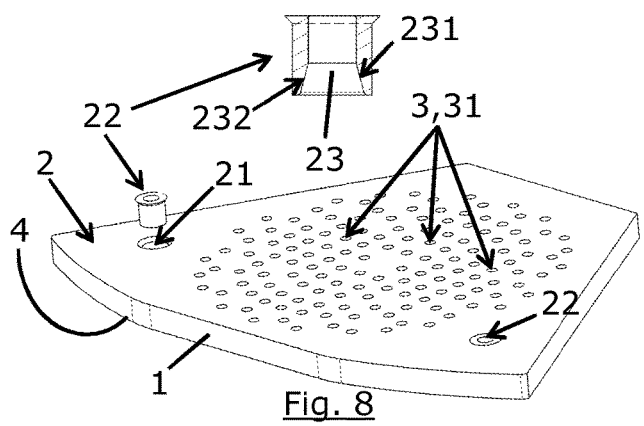
FIG. 8 is a diagrammatic representation of an oblique view of a cooking support comprising an interchangeable guidance device.

FIG. 8 shows a diagrammatic representation of an oblique view of an upper face 2 of a support 1 comprising a grid 31 of pass-through openings 3 and a through-hole 21 which according to the embodiment does not form part of the grid 31 of pass-through openings 3. A ring 22 can also be seen which, according to the embodiment, is arranged in order to be inserted on the side of the upper face 2 in the support 1. The ring 22 also has a chamfer 23 the faces 231, 232 of which extend from the opening of the ring 22 intended to be positioned on the side of the lower face 4 of the support 1 in which the projecting portions 6 of the transfer device 5 are inserted or are intended to be inserted. The ring 22 presents, on the side of the lower face 4 of the support 1, an opening that is oblong in shape. The cutting edge angle of the chamfer 23 can be comprised between 5 and 45°, preferably between 8 and 40°, more preferably between 10 and 30°; the cutting edge angle is 15° according to the embodiment.

Figure 9:
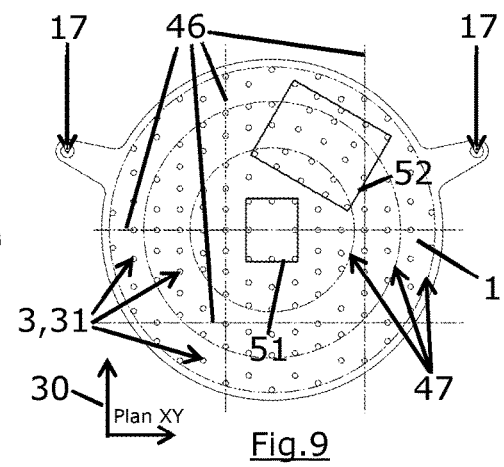
FIG. 9 is a diagrammatic representation of a top view of a cooking support.

The top view of a support 1 shown diagrammatically in FIG. 9 shows a grid 31 of pass-through openings 3 and two guide pass-through openings 17 which according to the embodiment do not form part of the grid 31. The particular arrangement of the grid 31 of pass-through openings 3, according to the embodiment, comprises sub-grids of pass-through openings having patterns such as, also, rows 46, circles 47, squares 51, rectangles 52. Sub-grids of pass-through openings 3 can be seen, formed by patterns of rows 46 and circles 47 being respectively complementary to the sub-grids (not shown) of rods 6 forming patterns (not shown) of rows 27 and circles 28. Two directions in which the patterns of rows 46 extend and two patterns of concentric circles 47 of different diameters are shown.

In the direction x of the plane 30 there are fifteen rows 46. These rows 46 are arranged in order to cooperate with sixteen prongs 16 of a fork 37, fourteen of said prongs being arranged in order to be inserted between two consecutive rows 46 and two additional prongs being situated on each edge of the grid 161 of prongs 16. Moreover, there are three concentric circles 28 having diameters of 160, 240 and 300 mm. By way of example, the pass-through openings 3 constituting the circle 28 of diameter 240 mm form a sub-grid adapted in order to receive culinary preparations 43 having a diameter in the vicinity of 240 mm. The pass-through openings forming the circle of diameter 160 mm form a sub-grid adapted in order to receive culinary preparations 43 having a diameter in the vicinity of 160 mm; said sub-grid belonging to the sub-grid of pass-through openings forming a circle of diameter 240 mm. Thus, the grid 31 of pass-through openings 3 has two sub-grids having circular patterns and being arranged in order to receive food preparations, preferably circular, having diameters comprised between 160 and 300 mm.

It is noted that the two guide pass-through openings 17 are positioned on two symmetrically-positioned lugs situated outside the grid 31 of pass-through openings 3. As the guide pass-through openings 17 are not comprised within the grid 31 of pass-through openings 3, it is possible to use a guidance device comprising a guide projecting portion 19 that is not retractable.

Figure 10:
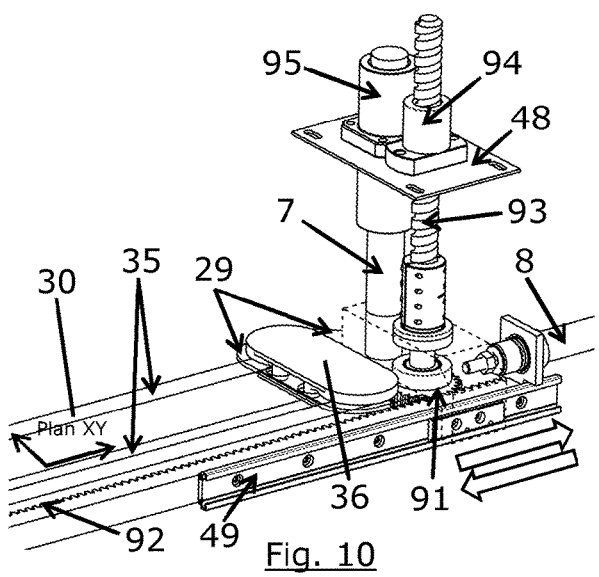
FIG. 10 is a diagrammatic representation of an oblique view of a sub-part of a system for driving relative movement.

FIG. 10 shows an oblique view of one of the two sub-parts of a system for driving relative movement. Each of the two sub-parts of the system for driving relative movement comprises the same elements arranged identically, with the exception of a cylinder 8 which is connected to one of the sub-parts only. The sub-part shown in FIG. 10 comprises a pneumatic cylinder 8 arranged in order to drive a gearing device 91, 92, 93. Said pneumatic cylinder 8 drives a rack 92 in translation in a rail 49. The rack 92 actuates a pinion 91, said pinion drives a drive screw 93 so as to convert the horizontal translational movement of the rack 92 into vertical translational movement of the entire system for driving relative movement with respect to the fixed element 48. A connecting element 29 can be seen on which is fixed on the one hand a rolling-element bearing 36 and on the other hand an assembly also comprising the pinion 91, a hollow tube 94, having a thread complementary to the thread of the drive screw 93, fixed to the fixed element 48 and a guide shaft 7, arranged in order to guide the vertical movement of the system for driving movement relative to the fixed element 48. The gearing device 91, 92, 93 is arranged in order to operate a reduction ratio between the stroke of the cylinder 8 and the stroke of the system for driving relative movement. The guide shaft 7 slides in a hollow cylinder 95, said hollow cylinder being fixed to the fixed element 48. The connecting element 29, according to the embodiment, is a tie 29 fixed to the two moveable elements 35 which according to the embodiment constitute the moveable element 35. The guide shaft 7 of each of the two sub-parts of the system for driving relative movement are each connected to a fixed element 48 via an adjustment device (not shown), making it possible to set the position of the system for driving relative movement in its entirety, in the plane 30, with respect to the fixed elements 48. According to the embodiment, the moveable elements 35 are connected to the transfer device 5, setting the adjustment device making it possible to set the position of the transfer device 5 in the plane 30 and thus to adjust the alignment of the grid 61 of projecting portions 6 with respect to the grid 31 of pass-through openings 3.

The rolling-element bearing 36, connected to a moveable element 35, makes it possible to give said moveable element 35 a mechanical clearance in the plane 30. The mechanical clearance given to the moveable element is comprised between 1 and 20 mm, preferably between 3 and 15 mm, more preferably between 4 and 8 mm; it is 6 mm according to the embodiment.

The rack 92 extends from the sub-part shown in FIG. 10, called first sub-part, to a second sub-part (not shown) of the system for driving relative movement. The first sub-part of the system for driving relative movement shown in FIG. 10 comprises a first end of the rack 92 and the second sub-part comprises a second end of said rack 92. As the system for driving relative movement only has one cylinder 8, the movement in translation of the rack 92 is transmitted by the rack 92 to the second sub-part (not shown) of the system for driving relative movement.

Figure 11:
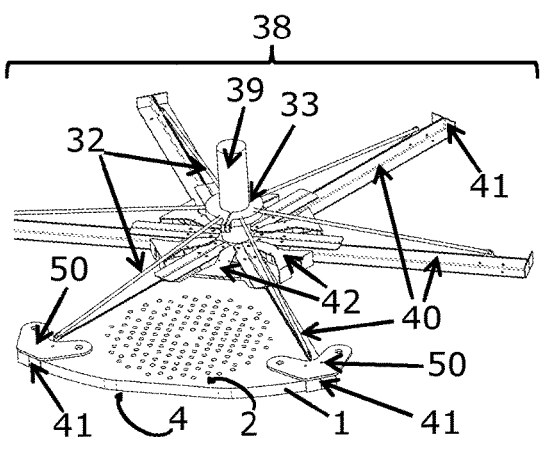
FIG. 11 is a diagrammatic representation of an oblique view of a cooking device.

FIG. 11 shows a diagrammatic representation of an oblique view of a cooking device 38. This cooking device 38 is particularly adapted to be incorporated into an enclosure 54 of a cooking oven 53, in particular in a pizza cooking oven 53. In order to ensure even cooking and to improve the quality thereof, the supports 1 used in said oven 53 will preferably be firestones.

A central shaft 39, connected to a device for driving in rotation 34 (not shown) can be seen, on which is fixed, by a first end, six cross members 40 extending in a plane perpendicular to the central shaft 39. A second end of each cross member 40 comprises a stop 41. Two adjacent cross members 40 and a system for holding in abutment 42 can also be seen; each system for holding in abutment 42 is fixed to the central shaft 39 and in contact with said two cross members 40.

In said FIG. 11, a cooking support 1 abuts two adjacent cross members 40, the support being held under pressure against the two stops 41 situated at the ends of the adjacent cross members 40 on which it rests. The cooking device can contain six cooking supports 1. The support 1 is held under pressure by the system for holding in abutment 42 which exerts pressure in a direction comprising a median situated equidistantly from said two adjacent cross members 40, extending from the central shaft 39 and comprised in the plane connecting said adjacent cross members 40. This system for holding in abutment 42 makes it possible to overcome the discrepancies caused by the effects of heat expansion due to the differences between the heat expansion coefficients of the support 1 and of the metal elements, such as, inter alia, the cross members 40. This system makes it possible to retain a positioning accuracy of +/−0.5 mm of the cooking supports 1 while passing from ambient temperature to the cooking temperature and vice-versa.

FIG. 11 also shows a collar 33 for fastening holding bars 32 fastened to the central shaft 39 and situated upstream of the upper surface 2 of the support 1 in a direction extending between the upper surface 2 and the lower surface 4 of the support 1. The fastening collar 33 preferably comprises two semi-cylindrical rings arranged in order to be clamped face to face on the central shaft 39. Holding bars 32 can be seen, each holding bar 32 extending between the fastening collar 33 of the holding bars and a cross member 40. Each holding bar 32 is composed of two parts (not shown) between which an intermediate element is located (not shown) making it possible to adjust the length of the holding bar 32 and thus the distance between the collar 33 and a cross member 40 and consequently the angle between said cross member 40 and the central shaft 39. For this reason, by adjusting two holding bars 32 connected to the two cross members, it is possible to adjust the angle between said cooking support 1 and the central shaft 39. Thus, by carrying out a cold adjustment of the angle between a cooking support 1 and the central shaft 39, it is possible to anticipate the variations of said angle due to the heat expansion of the elements of the cooking device when the oven 53 is in operation, when the oven 53 is in operation. Holding braces 50 are arranged in order to hold the cooking support 1 in abutment against the two adjacent cross members 40 on which it is placed.

Of course, the invention is not limited to the examples which have just been described and numerous adjustments can be made to these examples without exceeding the scope of the invention.

Thus, in variants of the aforementioned embodiments that can be combined together:
  a gearing device can be incorporated into the platen 25 of the transfer device 5 and arranged in order to drive the movement of the rods 6 with respect to the platen 5,
  in a low position 11, the rods 6 are inserted permanently into the pass-through openings 3 of the support 1 and are flush with the upper surface 2 of the support 1, an opening 21, which may or may not be a through-hole, in the guidance device, can form part of the grid 31 of pass-through openings 3, a guide pass-through opening 17 can form part of the grid 31 of pass-through openings 3, a guide projecting portion 19 can form part of the grid 61 of projecting portions 6, a ring 22 can comprise a male thread complementary to a female thread produced in the opening 21 so as to be inserted into the support 1 by screwing, the patterns of the sub-grids are adapted to the geometry of the culinary preparations 43, the elements of the cooking device 38 are preferably steel elements, more preferably made from stainless steel, the pressure exerted by the system for holding in abutment 42 can be provided by a spring, preferably made from a material known to a person skilled in the art for its thermal properties, in particular an alloy comprising nickel and chromium; preferably the spring can comprise Inconel®, the projecting portions 6 can preferably be made from stainless steel, the grid or the sub-grids of prongs 16 can be adapted in order to receive, simultaneously or consecutively, culinary preparations of different types, different geometries and different sizes, when only a part of the sub-grids of projecting portions 6 protrudes with respect to the upper surface 2 of the support 1, said sub-grids can be arranged so as to form several raised surfaces 14, the geometry of one of the raised surfaces 14 can be different from a geometry of another raised surface 14 or the geometries of several other raised surfaces 14 or the geometries of all the other raised surfaces 14, when only a part of the sub-grids of projecting portions 6 protrudes with respect to the upper surface 2 of the support 1, the distance between the upper surface 2 of the support 1 and the raised surface 14 formed by one of the sub-grids of protruding projecting portions 6 can be different from the distance between the upper surface 2 of the support 1 and another raised surface 14 formed by another of the sub-grids of protruding projecting portions 6, when only a part of the sub-grids of projecting portions 6 protrudes with respect to the upper surface 2 of the support 1, the distance between the upper surface 2 of the support 1 and the raised surface 14 formed by one of the sub-grids of protruding projecting portions 6 can be different from the distance(s) between the upper surface 2 of the support 1 and several other raised surfaces 14 formed by several of the other sub-grids of protruding projecting portions 6, when only a part of the sub-grids of projecting portions 6 protrudes with respect to the upper surface 2 of the support 1, the distance between the upper surface 2 of the support 1 and a raised surface 14 formed by one of the sub-grids of protruding projecting portions 6 can be different from the distance(s) between the upper surface 2 of the support 1 and all the other raised surfaces 14 formed by all the other sub-grids of protruding projecting portions 6, the moveable element 35 can be connected to the transfer device 5 or to the support 1; the part (5 or 1) not connected to the transfer device 5 is preferably immobile when the system for driving movement is actuated; setting the adjustment device makes it possible to set the position of the transfer device 5 or of the support 1 in the plane 30 and thus to adjust the alignment of the grid 61 of projecting portions 6 with respect to the grid 31 of pass-through openings 3, the moveable element 35 can be connected to the transfer device 5 or to the support 1; the part (5 or 1) not connected to the transfer device 5 is preferably immobile when the system for driving movement is actuated, a guide projecting portion 19 can be automatically retractable, a guide projecting portion 19 can be retractable when it meets a force exerted in a direction opposite to that of its displacement; the value of the force causing the retraction being capable of being predetermined, a guide projecting portion 19 can be retractable when it meets a force exerted in a direction parallel to the direction linking the upper surface 2 and the lower surface 4 of the support 1, the value of the force causing the retraction being capable of being predetermined, a projecting portion 6 can be automatically retractable, a projecting portion 6 can be retractable when it meets a force exerted in a direction opposite to that of its displacement; the value of the force causing the retraction being capable of being predetermined, a projecting portion 6 can be retractable when it meets a force exerted in a direction parallel to the direction linking the upper surface 2 and the lower surface 4 of the support 1, the value of the force causing the retraction being capable of being predetermined, the upper surface 2 and/or the lower surface 4 of the support 1 is not plane but has, for example, grooves and/or roughnesses and/or channels, the upper surface 26 of the platen 25 is not plane but has, for example, grooves and/or roughnesses and/or channels.

In addition, the various characteristics, forms, variants and embodiments of the invention can be combined together in various combinations to the extent that they are not incompatible or mutually exclusive.

The invention claimed is:

1. A system for handling culinary preparations, comprising:
   a support comprising:
      an upper surface arranged in order to receive a culinary preparation, and
      a plurality of pass-through openings extending between the upper surface and a lower surface;
   a transfer device comprising a plurality of projecting portions;
   a system for driving relative movement of the support with respect to at least one part of the transfer device;
   said system for driving relative movement is arranged in order to position the system in:
      a first position, in which no projecting portion protrudes with respect to the upper surface of the support;
      a second position, in which one end of at least one of said plurality of projecting portions protrudes, via the pass-through openings, with respect to the upper surface of the support, such that the culinary preparation no longer rests on the upper surface of the support but rests on a raised surface formed by said one end of at least one of said plurality of projecting portions protruding with respect to the upper surface of the support;
and in that said system for handling culinary preparations comprises a handling tool comprising a fork including a plurality of prongs having spaced, parallel oblong elements arranged in order to be inserted between the projecting portions in at least one of parallel and perpendicular directions to the upper surface of the support to form a surface for receiving the culinary preparation and for transferring the culinary preparation between the handling tool and the raised surface, wherein a maximum thickness of a respective prong is less than a minimum distance between said one end of the projecting portions protruded with respect to the upper surface of the support, wherein said distance is configured to provide an interpenetrating movement of the oblong elements relative to the projection portions.

2. The system according to claim 1, characterized in that:
the transfer device comprises a grid of projecting portions arranged in a pattern,
the support comprises a grid of pass-through openings arranged in a pattern complementary to the pattern of the grid of projecting portions;
said grids being arranged so that the grid of projecting portions can be inserted into the grid of pass-through openings.

3. The system according to claim 1, characterized in that the handling tool comprises a grid of oblong elements arranged in a pattern complementary to the pattern of the grid of projecting portions; said grid of oblong elements and said grid of projecting portions being arranged so that the grid of projecting portions and the grid of oblong elements interpenetrate.

4. The system according to claim 2, characterized in that the grid of projecting portions comprises a set of sub-grids, the set of sub-grids forming the grid of projecting portions; a portion of a sub-grid or a sub-grid being capable of forming part of one or more sub-grids.

5. The system according to claim 1, comprising a guidance device characterized in that at least one pass-through opening is a guide pass-through opening having a chamfer on a side of the lower surface of the support in which the projecting portions are intended to be inserted.

6. The system according to claim 1, comprising a guidance device characterized in that at least one projecting portion is a guide projecting portion being arranged in order to be inserted into a pass-through opening and having a length greater than a length of the projecting portions other than said at least one guide projecting portion.

7. The system according to claim 1, characterized in that said system comprises a guidance device comprising at least one guide projecting portion having a chamfer.

8. The system according to claim 1, characterized in that said system comprises an interchangeable through-hole guidance device comprising:
at least one through-hole produced in the lower face of the support; and
at least one ring arranged in order to be removably inserted into the at least one through-hole.

9. The system according to claim 1, characterized in that said system comprises a blind interchangeable guidance device comprising:
at least one blind opening produced in the lower face of the support;
at least one ring arranged in order to be removably inserted into the at least one blind opening; and
at least one retractable guide projecting portion, being arranged in order to be inserted into the at least one blind opening and being capable of relative movement with respect to the other projecting portions.

10. The system according to claim 4, characterized in that the transfer device comprises a platen and in that the plurality of projecting portions is a set of rods protruding with respect to an upper surface of said platen, the grid and the sub-grids of rods being arranged in order to form patterns composed of rows parallel to one another and extending in at least one direction parallel to the upper plane of the platen.

11. The system according to claim 4, characterized in that the grid and the sub-grids of rods are arranged in order to form patterns composed of circles of different diameters.

12. The system according to claim 1, characterized in that said system comprises a fastening means of the transfer device or of the support, said fastening means being arranged in order to provide a mechanical clearance between the transfer device and the support in a plane parallel to a plane in which the lower face of the support is comprised.

13. The system according to claim 1, characterized in that the system for driving relative movement comprises:
at least one fixed element;
at least one gearing device connected to the at least one fixed element;
at least one actuator arranged in order to drive the gearing device;
a fastening means of the transfer device or of the support comprises:
a moveable part fastened to the support or to the transfer device;
a connecting element fastened to the gearing device; and
a rolling-element bearing connected on the one hand to the moveable part and on the other hand to the connecting element, said gearing device being arranged in order to drive the moveable part in relative movement with respect to the at least one fixed part.

14. The system according to claim 1, characterized in that the support is a cooking support, said support being a heating element.

15. The system according to claim 1, characterized in that the support is a firestone.

16. The system according to claim 1, characterized in that said system comprises a cooking device comprising:
a plurality of cooking supports;
a central shaft arranged in order to be driven in rotation;
cross members fixed to the central shaft;
stops;
systems for holding in abutment;
and a cooking support is arranged in order to be placed in abutment on two adjacent cross members and a system for holding in abutment exerts a constant pressure on the cooking support to hold the cooking support under pressure against one or more stops.

17. The system according to claim 14, characterized in that the support is an electric hotplate.

18. The system according to claim 14, characterized in that the support is a refractory element.

* * * * *